(12) United States Patent
Biadatz et al.

(10) Patent No.: US 9,393,971 B2
(45) Date of Patent: Jul. 19, 2016

(54) VEHICLE BODY

(71) Applicant: SIEMENS AKTIENGESELLSCHAFT, Munich (DE)

(72) Inventors: Adrian Biadatz, Krefeld (DE); Bernd Gross, Krefeld (DE); Sascha Kirchhoff, Krefeld (DE)

(73) Assignee: Siemens Aktiengesellscaft, Munich (DE)

( * ) Notice: Subject to any disclaimer, the term of this patent is extended or adjusted under 35 U.S.C. 154(b) by 0 days.

(21) Appl. No.: 14/400,097

(22) PCT Filed: Apr. 4, 2013

(86) PCT No.: PCT/EP2013/057080
§ 371 (c)(1),
(2) Date: Nov. 10, 2014

(87) PCT Pub. No.: WO2013/167325
PCT Pub. Date: Nov. 14, 2013

(65) Prior Publication Data
US 2015/0143673 A1    May 28, 2015

(30) Foreign Application Priority Data

May 10, 2012    (DE) .......................... 10 2012 207 781

(51) Int. Cl.
| | | |
|---|---|---|
| *F16B 2/20* | (2006.01) |
| *B61D 17/18* | (2006.01) |
| *B60R 13/02* | (2006.01) |
| *B61D 17/00* | (2006.01) |
| *B61D 17/04* | (2006.01) |
| *F16B 2/24* | (2006.01) |

(52) U.S. Cl.
CPC ............ *B61D 17/00* (2013.01); *B60R 13/0206* (2013.01); *B61D 17/043* (2013.01); *B61D 17/18* (2013.01); *F16B 2/20* (2013.01); *F16B 2/245* (2013.01); *Y10T 24/44026* (2015.01); *Y10T 29/49947* (2015.01)

(58) Field of Classification Search
CPC .................. B60R 13/0206; B60R 2011/0059; B60R 2011/0071; B61D 17/00; B61D 17/043; B61D 17/18; F16B 2/20; F16B 2/245; Y10T 24/44026; Y10T 29/49947
USPC ...................... 296/146.7, 191, 1.07, 1.08, 214
See application file for complete search history.

(56) References Cited

U.S. PATENT DOCUMENTS

| | | | |
|---|---|---|---|
| 2,627,094 A * | 2/1953 | Bedford, Jr. ........ | B60R 13/0206 220/DIG. 3 |
| 2,976,972 A * | 3/1961 | Raymond ............ | B60J 10/0062 24/294 |

(Continued)

FOREIGN PATENT DOCUMENTS

| | | |
|---|---|---|
| DE | 3732086 A1 | 4/1989 |
| FR | 1428487 | 2/1966 |
| GB | 633751 | 12/1949 |

*Primary Examiner* — Gregory Blankenship
(74) *Attorney, Agent, or Firm* — Laurence Greenberg; Werner Stemer; Ralph Locher

(57) ABSTRACT

A vehicle body, in particular a rail vehicle body, includes at least one body shell profile and at least one interior fitting connected to the body shell profile. The interior fitting is held on the body shell profile by at least one fastening element which is slipped or pushed onto the body shell profile using a clip section and clamped there.

8 Claims, 3 Drawing Sheets

(56) References Cited

U.S. PATENT DOCUMENTS

| | | | | |
|---|---|---|---|---|
| 3,065,022 | A * | 11/1962 | Schutte | B60R 13/0206 296/214 |
| 3,875,661 | A * | 4/1975 | Lidstrom | B60R 19/52 267/140 |
| 6,123,385 | A * | 9/2000 | Bailey | B60J 5/0416 296/146.7 |
| 7,669,915 | B2 * | 3/2010 | Lipski | B60R 13/0243 296/1.08 |
| 7,828,372 | B2 * | 11/2010 | Ellison | B60R 13/04 24/297 |
| 8,469,438 | B2 * | 6/2013 | Mazur | B60R 13/0206 24/293 |
| 8,561,265 | B2 * | 10/2013 | Benedetti | F16B 21/086 24/297 |
| 8,876,200 | B2 * | 11/2014 | Huelke | B60R 13/0212 248/206.5 |
| 2004/0094989 | A1 * | 5/2004 | Matsumoto | B60J 10/0065 296/146.1 |
| 2005/0006927 | A1 * | 1/2005 | Granger | B60R 13/04 296/191 |
| 2005/0116485 | A1 * | 6/2005 | Kuroda | B60R 13/0206 296/1.08 |
| 2007/0046054 | A1 * | 3/2007 | Hinman | B60R 13/0206 296/1.07 |
| 2008/0066266 | A1 * | 3/2008 | Scroggie | B60R 13/0206 24/297 |
| 2008/0073860 | A1 * | 3/2008 | Yamaguchi | B60R 13/04 277/637 |
| 2011/0067206 | A1 * | 3/2011 | Senakiewich, II | B60R 13/025 24/289 |
| 2011/0163562 | A1 * | 7/2011 | Smith | B60R 13/0206 296/1.07 |
| 2012/0274094 | A1 * | 11/2012 | Mazur | B60R 13/0206 296/146.7 |
| 2013/0026788 | A1 * | 1/2013 | Kuhm | F16B 37/043 296/191 |
| 2013/0154304 | A1 * | 6/2013 | Tobey | B60R 13/0243 296/146.7 |
| 2013/0249230 | A1 * | 9/2013 | Gillay | B60R 13/0206 296/1.08 |
| 2013/0255065 | A1 * | 10/2013 | Bachelder | B60R 13/0206 29/525.01 |
| 2014/0191526 | A1 * | 7/2014 | Lauxen | B60R 13/0206 296/1.08 |
| 2014/0346798 | A1 * | 11/2014 | Chou | B60R 13/0206 296/1.08 |

* cited by examiner

VEHICLE BODY

BACKGROUND OF THE INVENTION

Field of the Invention

The invention relates to a vehicle body, in particular a rail vehicle body, having at least one body shell profile and at least one interior fitting connected to the body shell profile.

In the case of rail vehicle bodies, bores in the body shell profiles of the body shell of the rail vehicle bodies are customarily required nowadays in order to fasten interior fittings. By means of these bores, fastening elements are screwed onto the vehicle body shell, to which in turn the interior fittings are furthermore fastened. The mounting of interior fittings by screwing the fastening elements to the vehicle body shell is relatively time-consuming.

The problem addressed by the invention is that of specifying a vehicle body, in particular a rail vehicle body, which can be produced particularly quickly and easily.

BRIEF SUMMARY OF THE INVENTION

This problem is solved according to the invention by a vehicle body, in particular a rail vehicle body, having at least one body shell profile and at least one interior fitting connected to the body shell profile. Advantageous embodiments of the body according to the invention are specified in dependent claims.

According to this it is provided according to the invention that the interior fitting is held on the body shell profile by at least one fastening element which is slipped onto the body shell profile using a clip section and clamped there.

A substantial advantage of the body according to the invention should be seen in that it allows fastening elements to be mounted on body shell profiles simply by sliding on and clamping. Unlike bodies known in the prior art, it is not necessary for the fastening elements to be screwed to the body shell profiles.

A further substantial advantage of the body according to the invention is that it can be produced in a tolerance-insensitive manner, as no bores have to be provided in the body shell profiles for fastening the fastening elements which would define a subsequent positioning of the fastening elements. Through the sliding-on and clamping of the fastening elements provided according to the invention, it is possible to adjust the positioning of the fastening elements on the body shell profile to any previously occurring production tolerances, in that the positioning of the fastening elements is subsequently modified when sliding on.

In order to allow a particularly quick and easy fastening of the fastening element, it is regarded as advantageous for the body shell profile to have a periphery and for the periphery to be enclosed in a clamping manner by the clip section.

According to a particularly preferred embodiment of the body, it is provided that a first internal clip surface of the clip section rests on the body shell profile in planar fashion and the opposite second internal clip surface of the clip section rests on the body shell profile in punctiform or linear fashion, in particular forming a bearing edge.

With a view to the mounting of the interior fitting, it is regarded as advantageous for the internal clip surface of the clip section which rests on the body shell profile in planar fashion to be located on the side of the body shell profile facing the interior fitting and for the opposite internal clip surface of the clip section which rests on the body shell profile in punctiform or linear fashion to be located on the side of the body shell profile facing away from the interior fitting.

A first clip end of the clip section preferably rests on the side of the body shell profile facing the interior fitting and a second clip end of the clip section on the side of the body shell profile facing away from the interior fitting, wherein the second clip end is bent away from the body shell profile.

The body shell profile preferably has a planar plate section adjoining the periphery and a bent section which is separated from the periphery by the planar plate section and is bent away from the plane of the planar plate section.

The first clip end of the clip section is preferably likewise bent and rests on the bent section of the body shell profile, preferably in planar fashion.

The fastening element preferably has a bearing plate on which the interior fitting of the body rests.

The interior fitting preferably forms a covering part of the body or a component of a covering part of this kind.

The bearing plate and the clip section are preferably connected to one another by a spacer element. The spacer element is particularly preferably rotationally symmetrical, in order to guarantee a fixed connection. The spacer element particularly preferably extends perpendicularly to the carrier element and perpendicularly to the bearing plate.

In order to simplify mounting of the interior fitting to the fastening element, it is regarded as advantageous for the interior fitting of the body to be clamped between the bearing plate of the fastening element and a clamping plate.

There is preferably a thread in the bearing plate and/or in the spacer element, into which a screw is screwed. The screw may, for example, screw the clamping plate and the bearing plate and/or the clamping plate and the spacer element to one another.

The fastening element is particularly preferably held on the body shell profile solely by the clamping force of the clip section.

The invention moreover relates to a method of producing a body, in particular a rail vehicle body, in which at least one body shell profile and at least one interior fitting are connected to one another.

According to the invention, a method of this kind is preferably provided in that a clip section of at least one fastening element is slipped onto the body shell profile and clamped there and the interior fitting is fastened to the fastening element.

In relation to the advantages of the method according to the invention, reference is made to the above observations in relation to the body according to the invention, as the advantages of the body according to the invention substantially correspond to those of the method according to the invention.

BRIEF DESCRIPTION OF THE SEVERAL VIEWS OF THE DRAWING

The invention is explained in greater detail below with the help of exemplary embodiments; in these, by way of example.

DESCRIPTION OF THE INVENTION

For the sake of clarity, the same reference numbers are always used in the figures for identical or comparable components.

Figure 1:
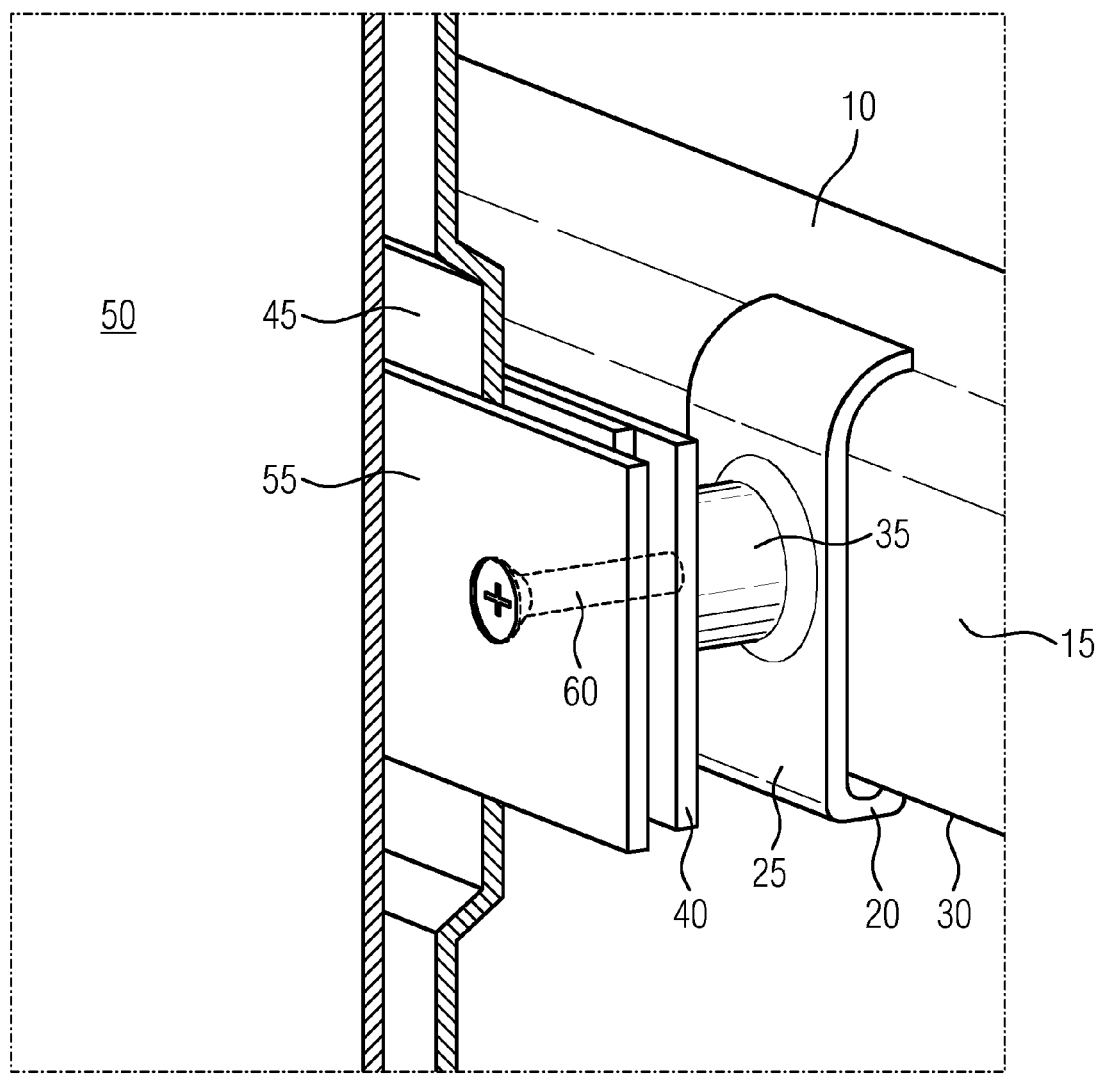
FIG. 1 shows an exemplary embodiment of a rail vehicle body according to the invention in which an interior fitting is held on a body shell profile with the help of a fastening element.

FIG. 1 shows an exemplary embodiment of a rail vehicle body 10 of which only a section is depicted in FIG. 1 for the sake of clarity. The body shell of the rail vehicle body 10 comprises a body shell profile 15 onto which a clip section 20 of a fastening element 25 is slipped from below in the depiction according to FIG. 1. The clip section 20 of the fastening element 25 comprises or embraces a lower periphery 30 of the body shell profile 15.

A spacer element 35 is in contact with the clip section 20 of the fastening element 25, which spacer element extends away from the clip section 20 perpendicularly, at least approximately perpendicularly, and therefore perpendicularly, at least approximately perpendicularly, from the body shell profile 15. The spacer element 35 stands with its end facing away from the clip section 20 in contact with a bearing plate 40 which is arranged at least approximately parallel to the clip section 20 and therefore at least approximately parallel to the body shell profile 15.

On the bearing plate 40 of the fastening element 25 rests an interior fitting 45 of the rail vehicle body 10. The interior fitting 45 may for example form a covering part or a component of a covering part 50 of the rail vehicle body 10.

It can be seen in FIG. 1 that the interior fitting 45 is pressed onto the bearing plate 40 by means of a clamping plate 55, as a result of which a fixing of the interior fitting 45 on the fastening element 25 is achieved. The clamping force required for clamping between the clamping plate 55 and the bearing plate 40 is created by a screw 60, for example, which is screwed into a thread in the spacer element 35 and/or into a thread in the bearing plate 40. Instead of a screw connection, a riveting, adhesive or welded connection may be produced as an alternative.

It can be seen in FIG. 1 that the fastening element 25 can be attached to the body shell profile 15 quickly and easily, as mounting only requires the clip section 20 of the fastening element 25 to be slid onto the lower periphery 30 of the body shell profile 15. The fastening element 25 does not need to be screwed onto the body shell profile 15, which means that the work involved in mounting the fastening element 25 is reduced to a minimum; moreover, adjustment tolerances can be balanced by adjusting the position of the fastening element 25 on the body shell profile 15 when sliding on.

Figure 2:
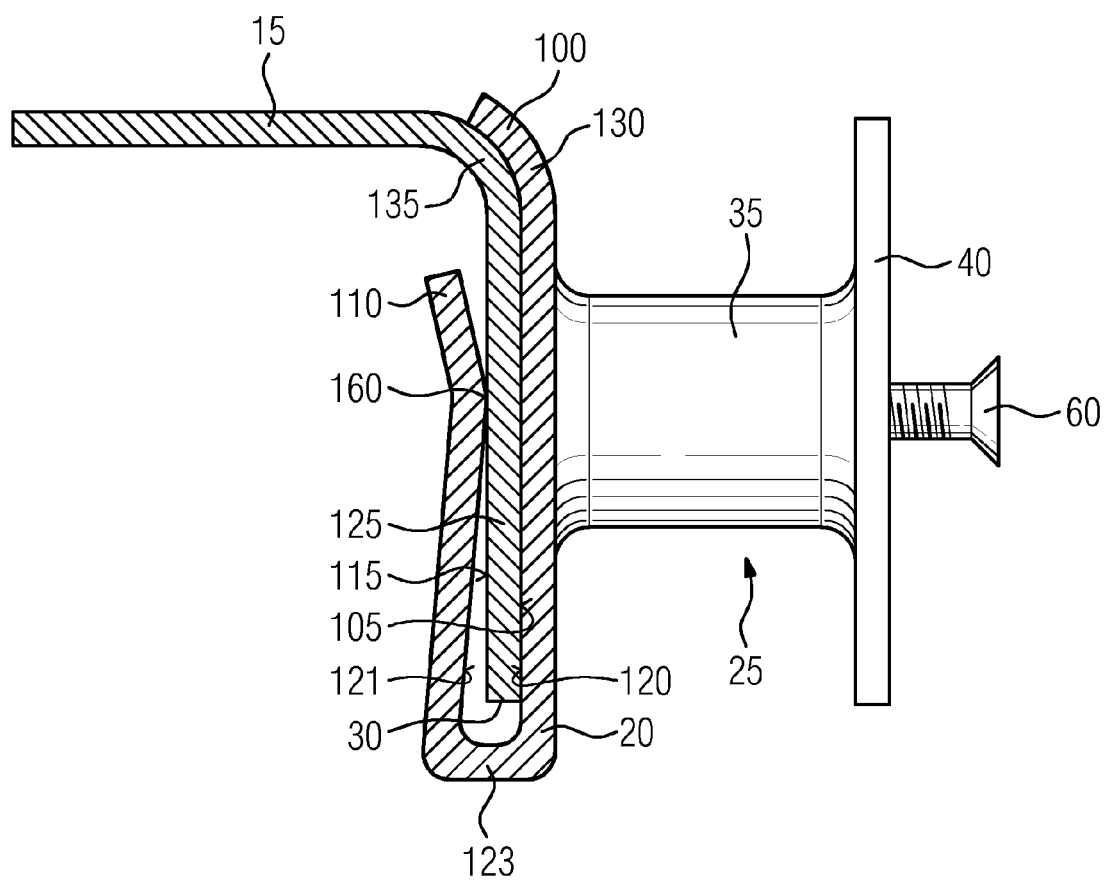
FIG. 2 shows the fastening element and the body shell profile according to FIG. 1 in cross section and FIG. 3 shows the fastening element and also the body shell profile according to FIG. 1 in a further three-dimensional view.

FIG. 2 shows the fastening of the fastening element 25 on the lower periphery 30 of the body shell profile 15 more closely in the detail in cross section. It can be seen that the clip section 20 of the fastening element 25 has two clip ends, namely a first clip end 100 which is located on the side 105 of the body shell profile 15 facing the spacer element 35 and also the bearing plate 40, and also a second clip end 110 which rests on the side 115 of the body shell profile 15 facing away from the spacer element 35 and also the bearing plate 40.

It can also be seen in FIG. 2 that the clip section 20 has two internal clip surfaces, namely a first internal clip surface 120 and a second internal clip surface 121.

The first internal clip surface 120 rests on the side 105 of the body shell profile 15 facing the spacer element 35 and is adapted in terms of shape to the shape of the body shell profile 15. It can therefore be seen that the lower section of the first internal clip surface 120 adjacent to the clip bottom 123 of the clip section 20 is planar or flat and therefore rests in planar fashion on a flat plate section 125 of the body shell profile 15 forming a planar contact. The friction between the first internal clip surface 120 and the flat plate section 125 is therefore maximum. The flat plate section 125 of the body shell profile 15 is preferably directly adjacent to the periphery 30 of the body shell profile 15.

The first clip end 100 of the clip section 20 moreover preferably has a bent end portion 130 which rests in planar fashion on a bent section 135 of the body shell profile 15. The bent section 135 of the body shell profile 15 is preferably directly adjacent to the flat plate section 125 of the body shell profile 15.

The function of the bent section 135 of the body shell profile 15 and also that of the bent end section 130 of the first clip end 100 is that of increasing the holding force and preventing the clip section 20 from slipping down from the body shell profile 15.

The second internal clip surface 121 rests on the side 115 of the flat plate section 125 facing away from the spacer element 35 only in punctiform or linear fashion, in order to bring to bear a maximum pressing force of the second internal clip surface 121 on the flat plate section 125 through a resilient pretension. The bearing line or bearing edge with which the second internal clip surface 121 rests on the side 115 of the body shell profile 15 is referred to in FIG. 2 using the reference number 160. The bearing edge 160 rests along with the first internal clip surface 120 on the flat plate section 125 of the body shell profile 15 and produces a clamping force jointly therewith.

In order to create the bearing edge 160 resting on the flat plate section 125, the second clip end 110 is preferably bent away from the bearing edge 160 and the flat plate section 125.

FIG. 2 moreover shows the screw 60 that allows the clip plate 55 shown in FIG. 1 to be screwed onto the supporting plate 40.

Moreover, it can be seen in FIG. 2 that the spacer element 35 may be rotationally symmetrical and preferably oriented both perpendicularly to the clip section 20 and also perpendicularly to the supporting plate 40.

Figure 3:
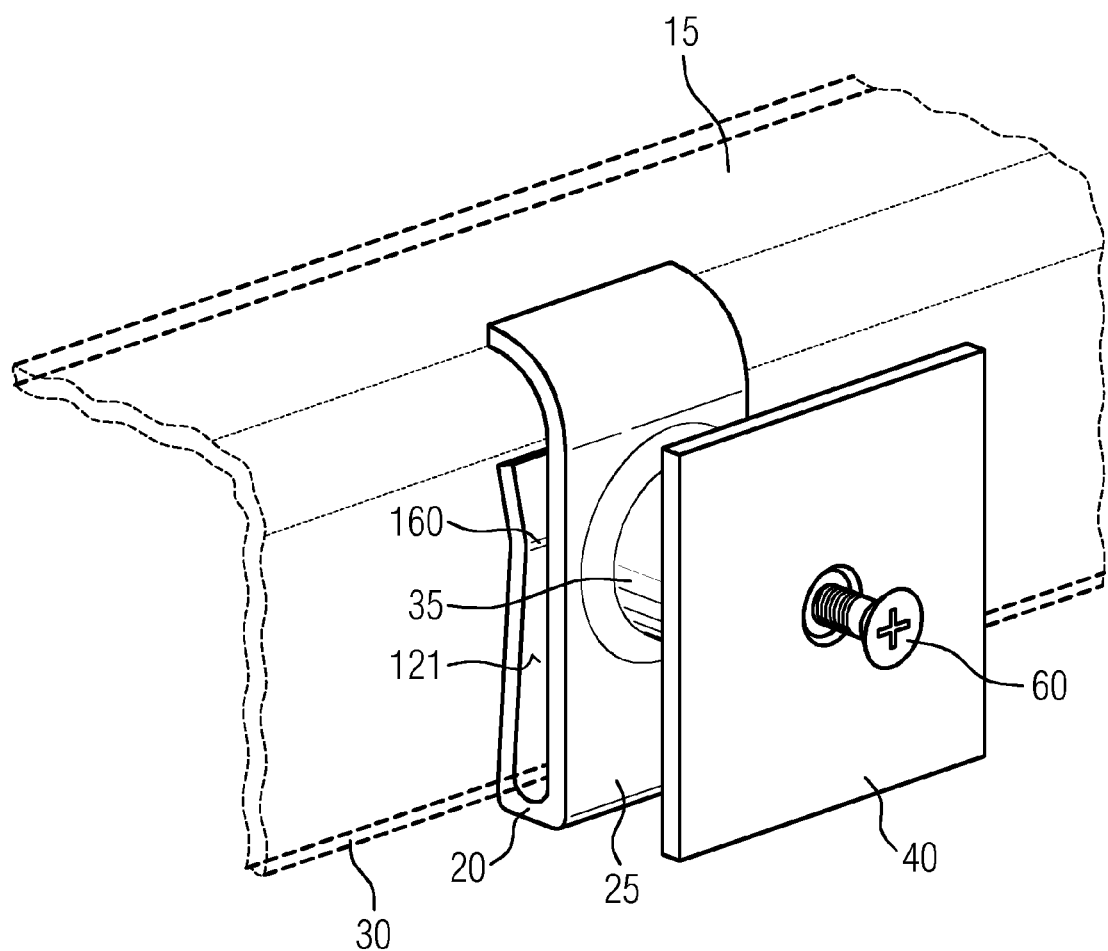

FIG. 3 shows the body shell profile 15 and also the fastening element 25 fastened thereto once again as a three-dimensional view from the side. It can be seen that the clip section 20 encloses the lower edge 30 of the body shell profile 15 and is held by clamping force on the body shell profile 15. Moreover, the bearing edge 160 can be seen by means of which the second internal clip surface 121 of the clip section 20 rests on the side of the body shell profile 15 facing away from the spacer element 35.

The screw 60 can also be seen which is screwed into a thread in the spacer element 35 and/or into a thread in the bearing plate 40.

Although the invention has been illustrated and described in detail by preferred exemplary embodiments, it is not limited by the examples disclosed and other variations may be derived from these by the person skilled in the art without departing from the scope of protection of the invention.

The invention claimed is:

1. A vehicle body or a rail vehicle body, comprising:
   at least one interior fitting;
   at least one body shell profile having a side facing said at least one interior fitting and a side facing away from said at least one interior fitting; and
   at least one fastening element holding and connecting said at least one interior fitting on said at least one body shell profile;
   said at least one fastening element having a clip section slipped onto said at least one body shell profile and clamping said at least one fastening element onto said at least one body shell profile;

said clip section having a first internal clip surface resting in planar manner on said side of said at least one body shell profile facing said at least one interior fitting;

said clip section having a second internal clip surface disposed opposite said first internal clip surface and resting in a punctiform or linear manner on said side of said at least one body shell profile facing away from said at least one interior fitting.

2. The vehicle body according to claim 1, wherein said second internal clip surface and said at least one body shell profile form a bearing edge.

3. The vehicle body according to claim 1, wherein:

said clip section has a first clip end resting on said side of said at least one body shell profile facing said at least one interior fitting; and said clip section has a second clip end resting on said side of said at least one body shell profile facing away from said at least one interior fitting and said second clip end is bent away from said at least one body shell profile.

4. The vehicle body according to claim 1, wherein said clip section provides a clamping force, and said at least one fastening element is held on said at least one body shell profile solely by said clamping force.

5. A vehicle body or a rail vehicle body, comprising:

at least one body shell profile having a periphery, a planar plate section adjoining said periphery and defining a plane and a bent section being separated from said periphery by said planar plate section and being bent away from said plane of said planar plate section;

at least one interior fitting; and at least one fastening element holding and connecting said at least one interior fitting on said at least one body shell profile;

said at least one fastening element having a clip section slipped onto said at least one body shell profile, enclosing and clamping said periphery of said at least one body shell profile and clamping said at least one fastening element onto said at least one body shell profile, said clip section having a first clip end and a second clip end, and said first clip end being bent and resting on said bent section of said at least one body shell profile in a planar manner.

6. A vehicle body or a rail vehicle body, comprising:

at least one body shell profile;

a clamping plate;

at least one interior fitting;

at least one fastening element holding and connecting said at least one interior fitting on said at least one body shell profile, said at least one fastening element having a bearing plate on which said at least one interior fitting rests;

said at least one fastening element having a clip section slipped onto said at least one body shell profile and clamping said at least one fastening element onto said at least one body shell profile;

a spacer element interconnecting said bearing plate and said clip section;

said at least one interior fitting being clamped between said bearing plate and said clamping plate;

at least one of said bearing plate or said spacer element having a thread formed therein; and a screw screwed into said thread.

7. The vehicle body according to claim 6, wherein said at least one interior fitting forms a covering part of the vehicle body.

8. The vehicle body according to claim 6, wherein said screw, said clamping plate and at least one of said bearing plate or said spacer element are screwed to one another.

* * * * *